United States Patent [19]

Raque et al.

[11] Patent Number: 5,345,747
[45] Date of Patent: Sep. 13, 1994

[54] ULTRASONIC SEALING APPARATUS AND METHOD

[75] Inventors: Glen F. Raque; Edward A. Robinson, both of Louisville, Ky.

[73] Assignee: Raque Food Systems, Inc., Louisville, Ky.

[21] Appl. No.: 19,773

[22] Filed: Feb. 19, 1993

[51] Int. Cl.⁵ .................................... B65B 51/22
[52] U.S. Cl. ........................ 53/478; 53/373.7; 53/374.4
[58] Field of Search ............ 53/478, 477, 471, 373.7, 53/374.2, 374.4, 374.3, 374.6, 374.5; 156/580.1, 580; 228/110

[56] References Cited

U.S. PATENT DOCUMENTS

| | | |
|---|---|---|
| 2,501,616 | 3/1950 | Robinson . |
| 2,833,238 | 5/1958 | Jones et al. . |
| 3,017,792 | 1/1962 | Elmore et al. . |
| 3,088,343 | 5/1963 | Balamuth et al. . |
| 3,217,957 | 11/1965 | Jarvie et al. . |
| 3,360,850 | 1/1968 | Avila . |
| 3,405,024 | 10/1968 | Attwood et al. . |
| 3,418,196 | 12/1968 | Luc . |
| 3,505,136 | 4/1970 | Attwood .................... 53/373.7 X |
| 3,508,376 | 4/1970 | Bemiss ....................... 53/478 |
| 3,541,671 | 11/1970 | Frachot . |
| 3,651,615 | 3/1972 | Bohner et al. . |
| 3,723,212 | 3/1973 | Casper ........................ 53/478 X |
| 3,899,116 | 8/1975 | Mims . |
| 3,899,377 | 8/1975 | Luc ............................. 156/73.5 |
| 3,920,504 | 11/1975 | Shoh et al. ................... 156/580 |
| 3,952,937 | 4/1976 | Lamons et al. ............... 228/110 |
| 3,955,740 | 5/1976 | Shoh .......................... 228/1 |
| 3,971,300 | 7/1976 | Bachner . |
| 4,072,089 | 2/1978 | Bosche ........................ 156/580.1 |
| 4,106,167 | 8/1978 | Luc ............................. 228/114 X |
| 4,144,110 | 3/1979 | Luc ............................. 228/112 X |
| 4,145,236 | 3/1979 | Neumayer et al. ........... 53/373.7 X |
| 4,266,993 | 5/1981 | Olsen .......................... 156/580.1 X |
| 4,326,903 | 4/1982 | Summo ....................... 156/73.1 |
| 4,333,791 | 6/1982 | Onishi ......................... 156/580.1 |
| 4,352,711 | 10/1982 | Toth ........................... 156/497 |
| 4,377,428 | 3/1983 | Toth ........................... 156/73.5 |
| 4,490,961 | 1/1985 | Raque ......................... 53/329 |
| 4,517,790 | 5/1985 | Kreager ....................... 53/552 |
| 4,529,473 | 7/1985 | Mims .......................... 156/580.2 |
| 4,534,818 | 8/1985 | Kreager et al. .............. 156/466 |
| 4,591,087 | 5/1986 | Frasch ........................ 228/110 |
| 4,601,089 | 7/1986 | Gal ............................. 29/157.3 |
| 4,618,516 | 10/1986 | Sager .......................... 428/35 |
| 4,668,316 | 5/1987 | Sager .......................... 156/73.1 |
| 4,767,492 | 8/1988 | Fukusima et al. ............ 53/373.7 X |
| 4,786,356 | 11/1988 | Harris ......................... 156/580.1 |
| 4,791,775 | 12/1988 | Raque et al. ................. 53/510 |
| 4,807,424 | 2/1989 | Robinson et al. ............ 53/432 |
| 5,082,160 | 1/1992 | Leigh .......................... 228/110 |
| 5,096,052 | 3/1992 | Raque et al. ................. 198/803.01 |

Primary Examiner—James F. Coan
Attorney, Agent, or Firm—Barnes & Thornburg

[57] ABSTRACT

An apparatus for sealing a covering material to an outer flange of a container includes a container carrier for aligning the covering material relative to the container so that a portion of the covering material is positioned over the outer flange of the container. The apparatus also includes a sealing assembly having a horn and a mechanism for applying pressure to the outer flange and to the covering material against the horn. The apparatus further includes a conveyor for moving the container carrier relative to the sealing assembly so that the outer flange of the container and the portion of the covering material positioned over the outer flange pass below the horn. In addition, the apparatus includes a mechanism for vibrating the horn at a predetermined frequency to cause friction between the outer flange of the container and the portion of the covering material positioned over the outer flange to seal the outer flange to the covering material. The angle of the horn is adjustable relative to the covering material so that the horn helps to propel the covering material in a direction of movement of the container carrier.

36 Claims, 3 Drawing Sheets

ULTRASONIC SEALING APPARATUS AND METHOD

BACKGROUND AND SUMMARY OF THE INVENTION

The present invention relates to an apparatus and method for sealing a sheet of covering material onto a container. More particularly, the present invention relates to an apparatus and method for ultrasonically sealing a sheet of covering material to a flange of a continuously moving container.

Containers for holding various products are often formed from paperboard, plastic, or a similar materials in a die press or thermoform machine. The containers are typically formed from flat paperboard blanks which have been scored in predetermined areas to facilitate formation of the containers. The scored sections reduce the likelihood that the blanks will tear as the containers are formed. Others are molded from sheet or resin. The containers are used to hold various products such as food.

Various types of automated systems are known for automatically filling containers moving along a predetermined path with a product such as food or the like. Containers are typically transported in metal container carriers along an assembly line path in a predetermined direction on a conveyor. A roller chain or other suitable drive means is used to move the container carriers along the assembly line path.

Individual containers which contain one or more servings of food and are sold either refrigerated or frozen are becoming increasingly popular. Such containers are typically processed on an assembly line, with the filling of the containers usually being accomplished with overhead buckets, funnels, spouts, or the dispensers that disburse a metered amount of the product into each individual container. See, for example, U.S. Pat. Nos. 4,699,297; 4,498,358; 4,678,015; and 4,823,988.

In some instances, a continuous sheet of material is used to cover and seal the containers. After the product is placed in the container, the sheet of material is sealed to the top of the containers and then cut. In other instances, individual container covers may be placed on the containers before sealing. Packaging devices often use heat sealing assemblies to heat seal the sheet of material or the covers to a flange of the containers. See, for example, U.S. Pat. Nos. 4,490,961; 4,807,424 and 4,991,375.

It is desirable to provide a continuous tight seal between the containers and the covering material. If areas between the container and covering material are not tightly sealed, oxygen or other contaminants can pass into the container and cause the food to spoil. Therefore, it is desirable to reduce the contact of oxygen or other contaminants with the contents of the container in order to increase the shelf life for the food item stored in the container.

Ultrasonic pulses are used in the illustrated embodiment of the present invention to seal the covering material to the flange of the containers. The ultrasonic sealing method of the present invention advantageously increases the speed of sealing the covering material to the containers as compared to conventional heat sealing assemblies. In addition, as the covering material for sealing containers becomes more sophisticated, known heat sealing techniques become less effective. Specifically, the covering material for sealing the containers can be a fiberboard lid which is printed to look visually attractive. These fiberboard lids are typically somewhat insulated. Therefore, the use of heat to seal the fiberboard lid is limited by the insulation of the lid. In addition, heat can damage the inks used to print information on the lids. The ultrasonic sealing method of the present invention facilitates sealing the fiberboard lids or other somewhat insulated covering materials to the containers. The ultrasonic sealing method of the present invention also permits the covering material to be sealed to the container flange through contaminants or excess food which may be located on the flange or the covering material.

Various types of ultrasonic sealing assemblies are known for welding two pieces of material together. It is known to provide a rotating roller which presses at least two sheets of material against a top surface of an ultrasonic vibrating head to weld the two sheets of material together. See, for example, U.S. Pat. Nos. 4,333,791 and 3,088,343. It is also known to provide a rotating welding disk or wheel coupled to an ultrasonic frequency transducer to transmit ultrasonic vibrations to the welding disk. In these known devices, the ultrasonic welding wheel presses two pieces of material against a solid support surface to ultrasonically weld pieces of material together. See, for example, U.S. Pat. Nos. 3,217,957; 3,360,850; and 5,082,160.

According to one aspect of the present invention, an apparatus for sealing a covering material to an outer flange of a container includes a sealing assembly having a horn and means for applying pressure to the outer flange and to the covering material against the horn. The apparatus also includes means for moving the container relative to the sealing assembly so that the outer flange of the container and the portion of the covering material positioned over the outer flange pass below the horn. The apparatus further includes means for adjusting the angle of the horn relative to the covering material and outer flange of the container. In addition, the apparatus includes means for vibrating the horn at a predetermined frequency to cause friction between the outer flange of the container and the portion of the covering material positioned over the outer flange to seal the outer flange to the covering material as the outer flange of the container and the portion of the covering material positioned over the outer flange pass below the horn.

In the illustrated embodiment of the present invention, the apparatus also includes means for reorienting the container relative to the sealing assembly. The apparatus further includes means for moving the reoriented container relative to the sealing assembly so that a second portion of the outer flange of the container and a portion of the covering material positioned over the second portion of the outer flange pass between the horn and the pressure applying means to seal the second portion of the outer flange to the covering material.

Also in the illustrated embodiment, the pressure applying means includes a wheel assembly having a rotating wheel which engages the outer flange of the container as the horn engages the covering material. A cylinder is coupled to the wheel assembly for moving the wheel assembly toward the horn so that the wheel applies a predetermined amount of pressure to the outer flange and to the covering material against the horn as the outer flange and the portion of the covering material positioned over the outer flange pass between the horn and the wheel. The wheel includes an edge surface for contacting a bottom surface of the outer flange of the container. The wheel is also formed to include a plurality of notched sections to prevent the edge surface from engaging the horn when the outer flange of the container and the portion of the covering material positioned over the outer flange are not located between the horn and the wheel.

In another embodiment of the present invention, the pressure applying means includes a container carrier for aligning the covering material relative to the container so that a portion of the covering material is positioned over the outer flange of the container. The container carrier has a top surface which engages the outer flange of the container as the horn engages the covering material.

The sealing assembly still further includes a guide bar having a ramp surface for forcing the covering material downwardly against the outer flange of the container. The guide bar is formed to include an aperture therein to permit the horn of the sealing assembly to extend through the guide bar and contact the covering material.

According to another aspect of the present invention, an apparatus is provided for sealing a covering material to an outer flange of a container including a first pair of opposite sides and a second pair of opposite sides. The apparatus includes a first pair of sealing assemblies for sealing the first pair of opposite sides of the outer flange of the container to adjacent portions of the covering material along a first pair of seam lines, and a first conveyor for transporting the container in a first direction through the first pair of sealing assemblies. The apparatus also includes a second pair of sealing assemblies for sealing the second pair of opposite sides of the outer flange of the container to adjacent portions of the covering material along a second pair of seam lines, and a second conveyor for transporting the container in a second direction through the second pair of sealing assemblies.

The first pair of seam lines overlaps the second pair of seam lines at corner portions of the container to form a tight seal between the covering material and the outer flange of the container. In the illustrated embodiment, the first conveyor continuously moves the container along a first predetermined path relative to the first pair of sealing assemblies and the second conveyor continuously moves the container along a second predetermined path relative to the second pair of sealing assemblies. The first conveyor is aligned at a predetermined angle relative to the second conveyor, and an end portion of the first conveyor is located adjacent the second conveyor so that containers move off the end portion of the first conveyor and onto the second conveyor.

According to yet another aspect of the present invention, a method for sealing a covering material to an outer flange of a container includes the steps of placing a covering material over the container flange, and providing a sealing assembly including a horn and means for applying pressure to the outer flange and to the covering material against the horn. The method also includes the steps of moving the container relative to the sealing assembly so that the outer flange of the container and a portion of the covering material positioned over the outer flange passes between the horn and the pressure applying means, and vibrating the horn at a predetermined frequency to cause friction between the outer flange of the container and the covering material as the outer flange of the container and the portion of the covering material positioned over the outer flange moves between the horn and the pressure applying means to seal the outer flange to the covering material.

This sealing method further includes the steps of reorienting the container relative to the sealing assembly, and moving the reoriented container carrier relative to the sealing assembly so that a second portion of the outer flange of the container and a portion of the covering material positioned over the second portion of the outer flange pass between the horn and the pressure applying means to seal the second portion of the outer flange to the covering material. The method still further includes the step of controlling the amount of pressure applied by the pressure applying means to the outer flange and to the covering material against the horn.

According to still another aspect of the present invention, a method for sealing a covering material to an outer flange of a container includes the steps of placing a covering material over the container flange, and providing first and second spaced apart sealing assemblies, each sealing assembly including a horn and means for applying pressure to the outer flange and to the covering material against the horn. The method also includes the steps of moving the container relative to the sealing assemblies so that outer flanges of the container adjacent a first pair of opposite sides of the container and the covering material pass between the horns and the pressure applying means of the first and second sealing assemblies, and vibrating the horns of the first and second sealing assemblies at a predetermined frequency to cause friction between the outer flanges of the container and the covering material as the outer flanges of the container and the portions of the covering material positioned over the outer flanges move between the horns and the pressure applying means of the first and second sealing assemblies, respectively, to seal the outer flanges of the container adjacent a first pair of opposite sides of the container to the covering material.

This sealing method further includes the steps of providing third and fourth spaced apart sealing assemblies, the third and fourth sealing assemblies each including a horn and means for applying pressure to the outer flange and to the covering material against the horn. The method still further includes the steps of orienting the container relative to the third and fourth sealing assemblies, and moving the oriented container relative to the third and fourth sealing assemblies so that outer flanges of the container adjacent a second pair of opposite sides of the container and the covering material pass between the horns and the pressure applying means of the third and fourth sealing assemblies, respectively. In addition, the method includes the step of vibrating the horns of the third and fourth sealing assemblies at a predetermined frequency to cause friction between the outer flanges of the container and the covering material as the outer flanges of the container and the portions of the covering material positioned over the outer flanges move between the horns and the pressure applying means of the third and fourth sealing assemblies to seal the unsealed portions of the outer flanges of the container adjacent a second pair of opposite sides of the container to the covering material.

In both the apparatus and method of the present invention, the horns used to seal the covering material to the flange of the container are aligned at a predetermined angle relative to the covering material. Preferably, the predetermined angle is adjustable relative to the covering material. By adjusting the angle of the horns relative to the covering material, the apparatus and method of the present invention permit the sealing assembly to operate at higher pressures and higher speeds. In addition to applying pressure to the covering material, the angled horns also help to propel the covering material in a direction of movement of the container. This reduces the likelihood that the covering material will bunch up at the horn.

Additional objects, features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying Figures in which.

DETAILED DESCRIPTION OF THE DRAWINGS

Figure 1:
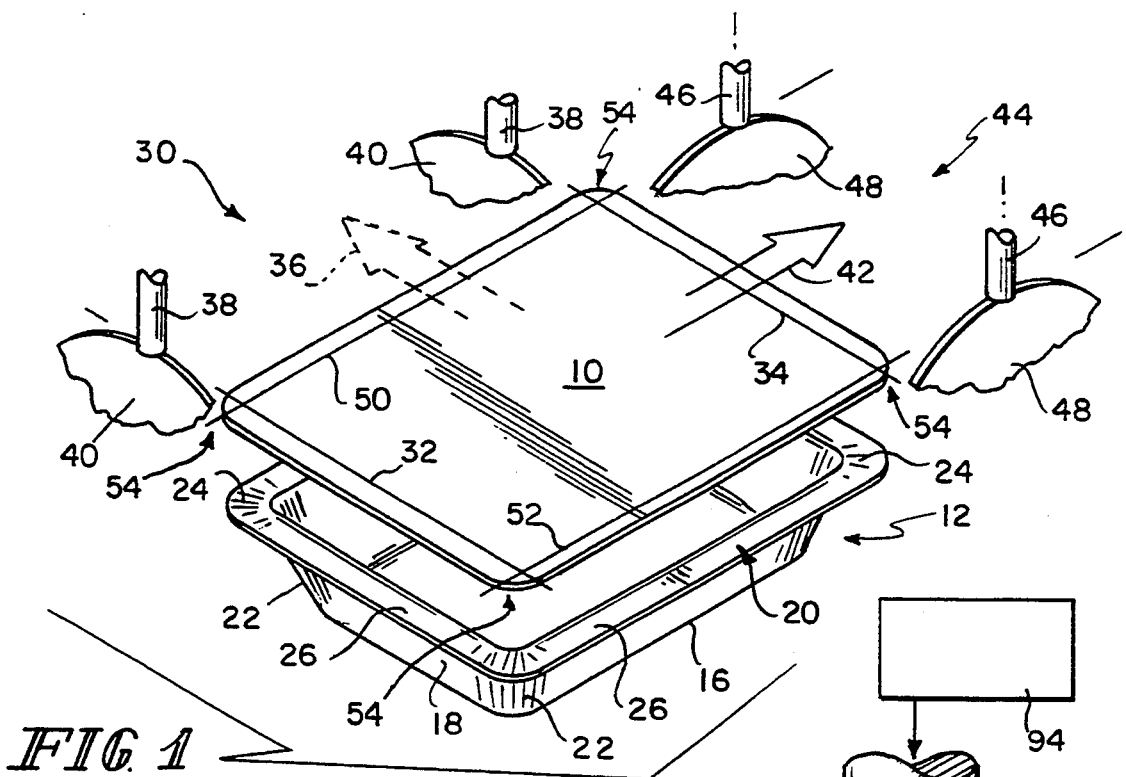
FIG. 1 is a diagrammatical perspective view illustrating a container and container cover which is sealed to the container with two pairs of ultrasonic sealing assemblies.

The present invention relates to a method and apparatus for ultrasonically sealing a sheet of covering material such as the container cover 10 illustrated in FIG. 1 to a container 12. Container 12 is illustratively formed by stamping a flat paperboard blank in a die press (not shown). The flat paperboard blank is scored in corner regions 22 prior to stamping the container in the die press so that the corner regions 22 can be formed without tearing. The container 12 includes a flat bottom surface 16, a side wall 18, and a top outer flange 20 surrounding container 12. Because scored sections are compressed together to form the corner regions 22 of the container 12, the scored corner regions 22 are thicker than the nonscored regions of container 12. Therefore, the flange 20 of container 12 includes first regions 24 which have a first thickness and second regions 26 which have a second thickness less than the first thickness. Illustratively, the thickness of the first regions 24 is about twice the thickness in the second regions 26. The nonuniform thickness of flange 20 creates problems when trying to seal the cover 10 to the flange 20 of container 12. An air tight seal must be provided in order to extend the life of food products located within the container 12. Because flange 20 has a nonuniform thickness, it is difficult to seal cover 10 to container 12, especially in the transitional areas between the first and second regions 24 and 26 of the flange 20 in which the thickness changes.

In order to seal cover 10 to flange 20 of container 12, the present invention uses a first pair of ultrasonic sealing assemblies 30 to ultrasonically weld seams 32 and 34 along opposite sides of cover 10 and container 12 as the container 12 is transported in a first direction illustrated by arrow 36. First pair of ultrasonic welding assemblies 30 include a resonator or horn 38 and a pressure roller or wheel 40. As container 12 moves in the direction of arrow 36, flange 20 and opposite edge portions of cover 10 pass between horns 38 and wheels 40 of the first pair of sealing assemblies 30 to seal the cover 10 to flange 20 along welded seam lines 32 and 34. After container cover 10 is welded to flange 20 along seams 32 and 34 by the first pair of ultrasonic sealing assemblies 30, the container 12 is reoriented and transported in the direction of arrow 42 so that the non-sealed side edges of cover 10 and container 12 pass between a second pair of ultrasonic sealing assemblies 44. Each of the second ultrasonic sealing assemblies 44 includes a resonator or horn 46 and a pressure roller or wheel 48. As container 12 moves in the direction of arrow 42, the flange 20 of container 12 and an edge portions of cover 10 pass between horn 46 and wheel 48 located on opposite sides of container 12. Therefore, the second pair of ultrasonic sealing assemblies 44 forms welded seams 50 and 52 between container flange 20 and cover 10.

As illustrated in FIG. 1, the seams 32 and 34 formed by the first pair of ultrasonic sealing assemblies 30 and the seams 50 and 52 formed by the second pair of ultrasonic sealing assemblies 44 overlap along corner portions of container cover 10 and flange 20 as illustrated at locations 54. This overlapping of seams 32 and 34 and 50 and 52 provides a tight seal between container cover 10 and flange 20 to reduce the amount of oxygen passing into the sealed container 12.

Figures 2, 4:
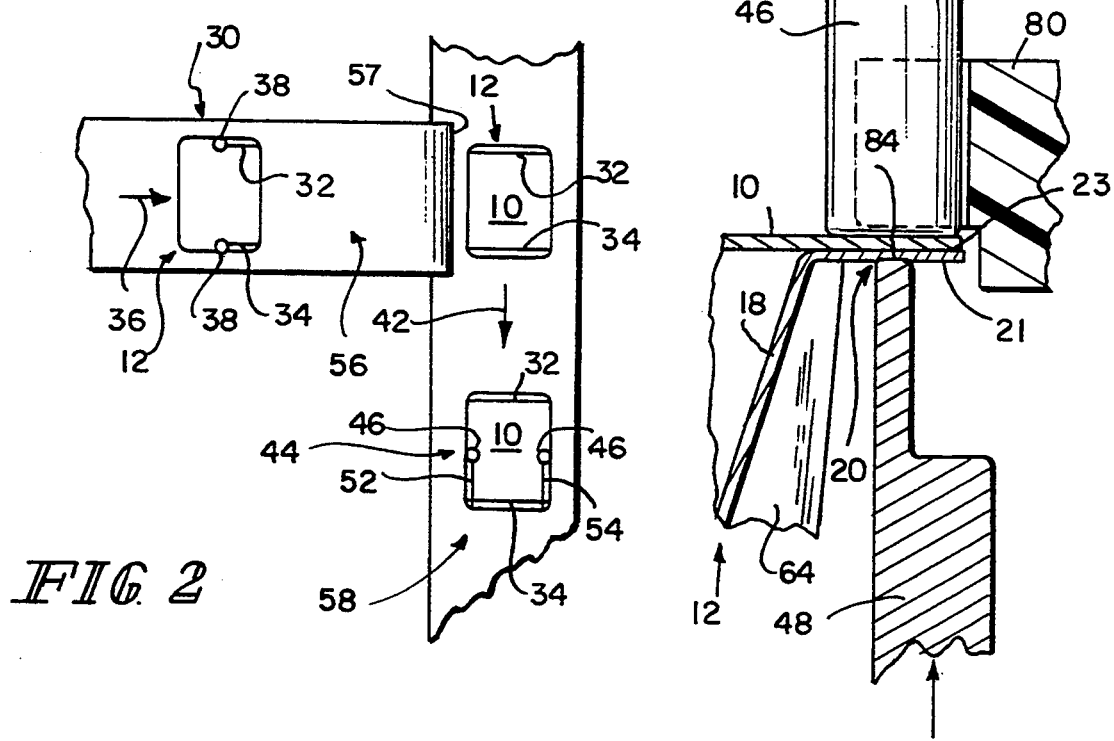
FIG. 2 is a diagrammatical view illustrating first and second conveyors for transporting the container and container cover past a first pair of ultrasonic sealing assemblies to seal a first pair opposite side edges of the cover to the container flange and a second conveyor for transporting the container and container cover past a second pair of ultrasonic sealing assemblies to seal a second pair of opposite side edges of the cover to the container.
FIG. 4 is a sectional view taken through a portion of FIG. 3 further illustrating an ultrasonic horn and the rotating wheel of the ultrasonic sealing assembly.

As illustrated in FIG. 2, the ultrasonic sealing apparatus and method of the present invention is capable of ultrasonically sealing container cover 10 to container 12 as the container 12 is continuously moving. The container 12 is transported on a first conveyor 56 through the first pair of ultrasonic sealing assemblies 30 in the direction of arrow 36 in FIG. 2. Horns 38 engage the container cover 10 while wheels 40 engage bottom surface 21 of flange 20 of container 12 to form welded seams 32 and 34 on opposite sides of container 12. Containers 12 continue past the first pair of ultrasonic sealing assemblies 30 on conveyor 56 and move off an end portion 57 of first conveyor 56 and are deposited onto a second conveyor 58. The containers 12 deposited on second conveyor 58 are transported in the direction of arrow 42 through the second pair of ultrasonic sealing assemblies 44. As containers 12 pass through second pair of ultrasonic sealing assemblies 44, horns 46 engage the container cover 10 and wheels 48 engage bottom surface 21 of flange 20 of container 12 to apply pressure against horns 46 and form weld seams 52 and 54.

It is understood that the relative positions of horns 38 and 46 and wheels 40 and 48 may be switched so that horns 38 and 46 engage flange 20 while wheels 40 and 48 engage cover 10. In addition, other devices may be used for applying pressure to flange 20 and cover 10 against horns 38 and 46. For instance, a flat pressure plate or other suitable mechanism may be used.

Although the illustrated embodiment includes first and second conveyors 56 and 58 for transporting the containers 12 past the first pair of sealing assemblies 30 and the second pair of sealing assemblies 44, respectively, it is understood that a single conveyor and a single pair of sealing assemblies may be used. If it is desired to use only a single pair of sealing assemblies, the containers must be reoriented on the conveyor so that a first pair of opposite sides of the container 12 pass through the sealing assemblies the first time the container 12 passes the sealing assemblies and so that a second pair of opposite sides of the container 12 pass through the sealing assemblies during the second time the container passes the sealing assemblies. In other words, the containers 12 must be rotated 90° prior to passing through the sealing assemblies for the second time. In some circumstances, a single sealing assembly may also be used.

Figure 3:
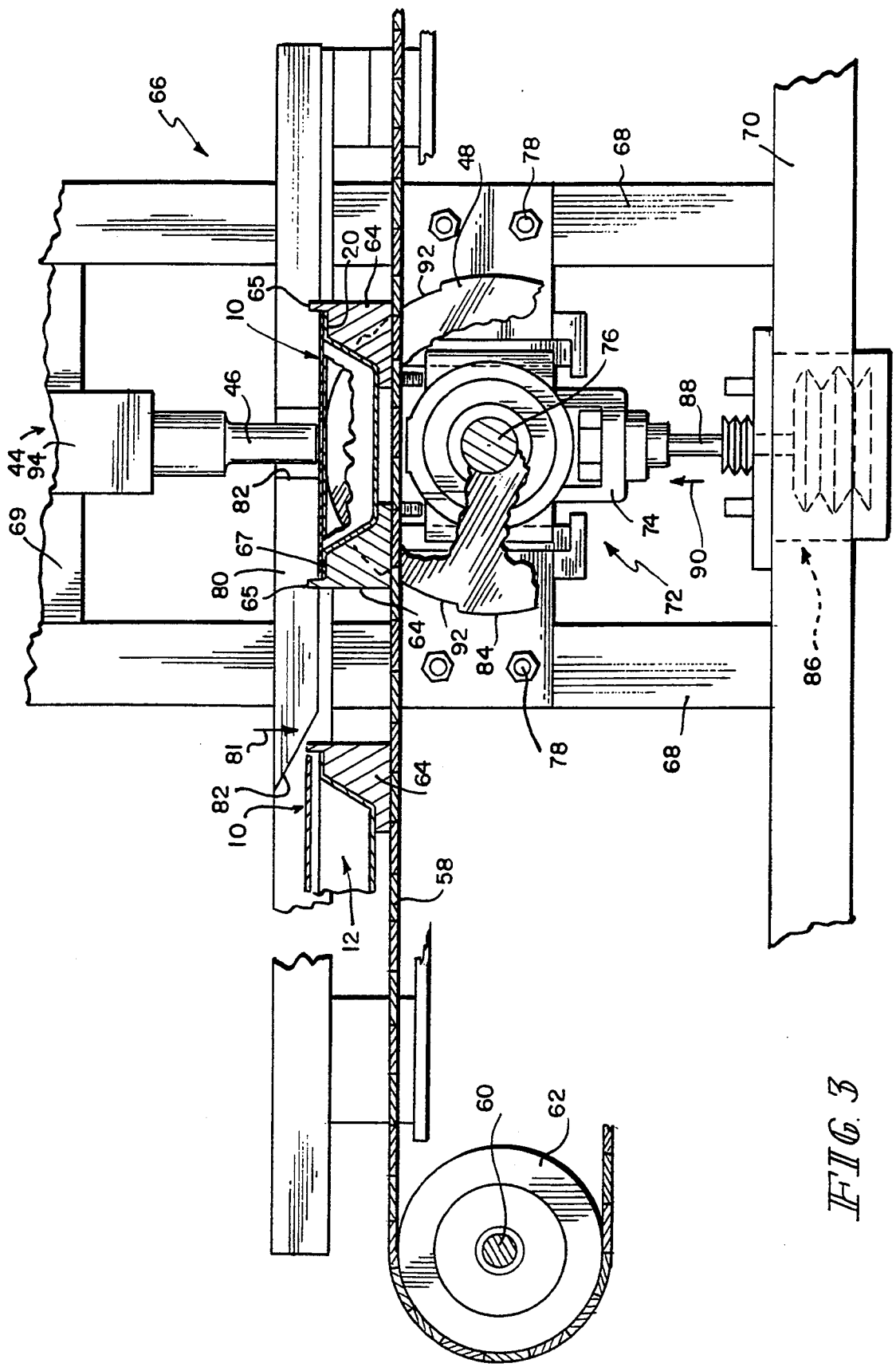
FIG. 3 is a sectional view taken through the second conveyor of the present invention with portions broken away illustrating details of the ultrasonic sealing assembly for sealing the container covers to the flange of the container.

FIG. 3 illustrates one of the second ultrasonic sealing assemblies 44. Each of the ultrasonic sealing assemblies 30 and 44 are identical so only a single ultrasonic sealing assembly will be described in detail. As illustrated in FIG. 3, conveyor 58 is driven by a drive shaft 60 coupled to drive roller 62. Containers 12 move along conveyor 58 in metal container carriers 64 formed to receive the containers 12 and container covers 10. In the illustrated embodiment, carrier 64 is formed by two spaced apart carrier halves located adjacent opposite ends of container 12. Carriers 64 include an outer lip 65 for positioning covers 10 relative to containers 12.

Ultrasonic sealing assembly 44 includes a frame 66 including spaced apart vertical side supports 68, a support plate 69 for each ultrasonic generator 94, and a horizontal lower support 70. A wheel assembly 72 is provided for rotating wheel 48. Wheel assembly 72 includes a housing 74 and a drive shaft 76 coupled to wheel 48. Drive shaft 76 is synchronized with to drive shaft 60 of conveyor 58 so that rotation of wheel 48 is synchronized with the movement of conveyor 58. Wheel assembly 72 is coupled to vertical side supports 68 by suitable fasteners 78. However, housing 74 of wheel assembly 72 can move up and down relative to frame 66 as discussed below.

Frame 66 of ultrasonic sealing assembly 44 includes a guide bar 80. Guide bar 80 includes a ramp surface 82 which engages the container cover 10 and forces the container covers 10 downwardly in the direction of arrow 81 against the container flange 20. This assures that container cover 10 abuts the flange 20 prior to passing between horn 46 and wheel 48 of ultrasonic sealing assembly 44. Guide bar 80 includes an aperture which permits horn 46 to pass through guide bar 80 and engage cover 10.

As container carriers 64 pass ultrasonic sealing assembly 44, sealing horn 46 engages the container cover 10. As illustrated in FIG. 4, outer lip 65 does not extend completely around carriers 64. Therefore, a top edge 84 of wheel 48 engages a bottom surface 21 of flange 20. A cylinder arrangement 86 is coupled to housing 74 of roller assembly 72 by shaft 88. Cylinder 86 pushes upwardly on housing 74 roller assembly 72 with a predetermined force in the direction of arrow 90 so that the outer surface 84 of wheel 48 applies a predetermined force or pressure against the bottom surface 21 of flange 20. This pressure causes horn 46 to ultrasonically weld container cover 10 to flange 20 of container 12 as container 12 passes between horn 46 and wheel 48. The amount of force applied by cylinder 86 can be adjusted depending upon the specifications of horn 46 and upon the type of material being sealed. Notched sections 92 are provided in roller 48 so that no pressure is applied against horn 46 by roller 48 during the intervals in which no container 12 is passing between roller 48 and horn 46.

The contact between container cover 10 and top surface 23 of flange 20 is further illustrated in FIG. 4. An ultrasonic generator 94 is coupled to horn 46 to vibrate the horn 46 at an ultrasonic frequency. This causes friction between a top surface 23 of flange 20 and the container cover 10. This friction bonds container cover 10 to top surface 23 of flange 20 along the seam lines 32, 34, 50, and 52 as illustrated in FIGS. 1 and 2.

In another embodiment of the present invention, a top surface 67 of container carrier 64 is formed to abut outer flange 20 of container 12 along the entire outer periphery of container 12. In this embodiment, horn 46 engages cover 10 as container carrier 64 passes below horn 46. Horn 46 forces cover 10 and flange 20 against top surface 67 of carrier 64 which causes sealing between flange 20 of container 12 and cover 10. Top surface 67 of container carrier 64 therefore replaces roller assembly 72 and cylinder arrangement 86. In other words, top surface 67 of container carrier 64 provides means for applying pressure to the outer flange 20 of the container 12 and to the covering material 10 against the horn 46 in this alternative embodiment of the present invention.

Sealing horns 46 and ultrasonic generators 94 are conventional ultrasonic equipment available from Branson Ultrasonics Corporation in Danbury, Conn. Although the invention has been described in terms of an ultrasonic sealing assembly, it is understood that the resonant frequency of horns 46 may be adjusted to any suitable high frequency, even if that frequency is not in the ultrasonic range. Therefore, the horn 46 may be dimensioned to be resonant at any suitable high frequency which bonds the container cover 10 to the flange 20. Illustratively, this frequency range is from about 16 kHz to about 100 kHz. However, other frequencies may be used.

Figure 5:
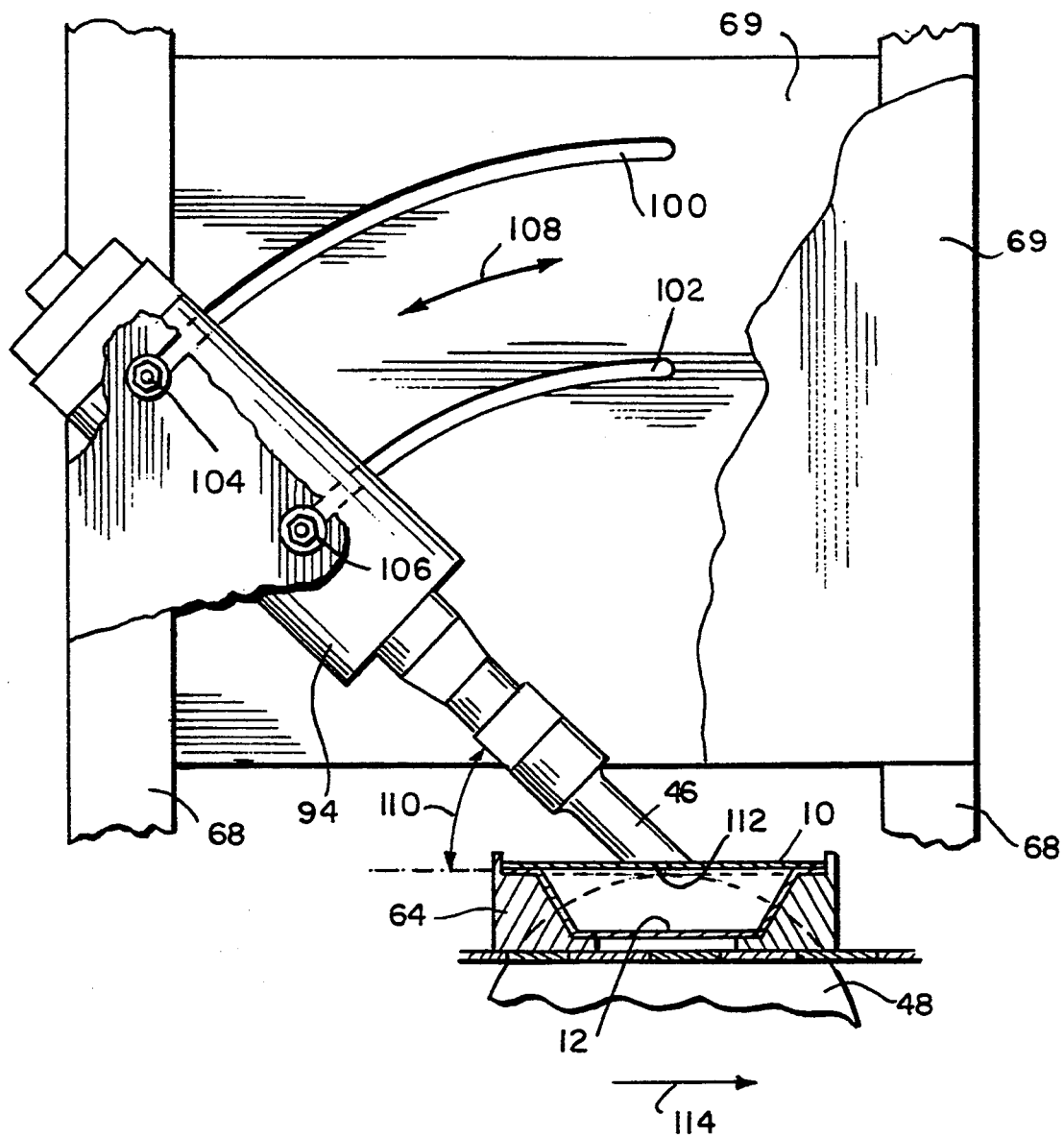
FIG. 5 is a side elevational view with portions broken away illustrating an ultrasonic generator which is adjustable relative to the frame to change the angle of the ultrasonic horn relative to the container flange and covering material.

Another feature of the present invention is illustrated in FIG. 5. Support plates 69 on opposite sides of conveyor 58 are formed to include first and second slots 100 and 102 therein. Ultrasonic generators 94 are slidably coupled to support plates 69 by fasteners 104 and 106 which extend through slots 100 and 102, respectively. Therefore, ultrasonic generators 94 can slide back and forth within slots 100 and 102 in the direction of double-headed arrow 108 to change the angle 110 between the ultrasonic horn 46 and the container cover 10. By loosening fasteners 104 and 106, the angle of ultrasonic generator 94 can be adjusted to an infinite number of positions between the angled position illustrated in FIG. 5 and the vertical, upright position illustrated in FIG. 3. Depending upon the type of material being sealed to container 12 and depending upon the speed of conveyor 58, the angle of ultrasonic generator 94 can be adjusted so that the material does not "bunch" up between the ultrasonic horn 46 and container carrier 64. When in the angled position of FIG. 5, a contact surface 112 of ultrasonic horn 46 must be cut or machined at an angle so that contact surface 112 remains parallel to lid 10. In the angled configuration illustrated in FIG. 5, ultrasonic generator 94 and contact surface 112 of horn 46 cause friction between the surfaces of container flange 20 and lid 10 to heat and seal lid 10 to flange 20. Preferably, horn 46 is cut at an angle the same as or approximately equal to angle 110. The angled horn 46 also helps to propel the material in the direction of movement of container 12 illustrated by arrow 114 in FIG. 5 so that the material does not bunch up between ultrasonic horn 46 and container carrier 64. This permits the ultrasonic sealing apparatus to be operated at higher pressures and faster speeds.

Although the invention has been described in detail with reference to a certain preferred embodiment, variations and modifications exist within the scope and spirit of the invention as described and defined in the following claims.

What is claimed is:

1. An apparatus for sealing a covering material to an outer flange of a container, the apparatus comprising:
    a sealing assembly including a horn aligned at a selected angle relative to the covering material and the outer flange of the container and means for applying pressure to the outer flange and to the covering material against the horn;
    means for moving the container relative to the horn so that the outer flange of the container and the portion of the covering material positioned over the outer flange pass below the horn;
    means for adjusting the angle of the horn relative to the covering material and outer flange of the container; and
    means for vibrating the horn at a predetermined frequency to cause friction between the outer flange of the container and the portion of the covering material positioned over the outer flange to seal the outer flange to the covering material as the outer flange of the container and the portion of the covering material positioned over the outer flange pass below the horn.

2. The apparatus of claim 1, further comprising means for reorienting the container relative to the sealing assembly, and means for moving the reoriented container relative to the horn so that a second portion of the outer flange of the container and a portion of the covering material positioned over the second portion of the outer flange pass below the horn to seal the second portion of the outer flange to the covering material.

3. The apparatus of claim 1, wherein the pressure applying means includes a wheel assembly having a rotating wheel which engages the outer flange of the container as the horn engages the covering material.

4. The apparatus of claim 3, further comprising a cylinder coupled to the wheel assembly for moving the wheel assembly toward the horn so that the wheel applies a predetermined amount of pressure to the outer flange and to the covering material against the horn as the outer flange and the portion of the covering material positioned over the outer flange pass between the horn and the wheel.

5. The apparatus of claim 3, wherein the wheel includes an edge surface for contacting a bottom surface of the outer flange of the container.

6. The apparatus of claim 5, wherein the wheel is formed to include a plurality of notched sections to prevent the edge surface from engaging the horn when the outer flange of the container and the portion of the covering material positioned over the outer flange are not located between the horn and the wheel.

7. The apparatus of claim 1, wherein the sealing assembly includes a guide bar having a ramp surface for forcing the covering material downwardly against the outer flange of the container.

8. The apparatus of claim 7, wherein the guide bar is formed to include an aperture therein to permit the horn of the sealing assembly to extend through the guide bar and contact the covering material.

9. The apparatus of claim 1, wherein the moving means includes a conveyor for transporting the container along a predetermined path.

10. The apparatus of claim 1, wherein the moving means continuously moves the container along a predetermined path relative to the sealing assembly.

11. The apparatus of claim 1, wherein the pressure applying means includes a container carrier for aligning the covering material relative to the container so that a portion of the covering material is positioned over the outer flange of the container, the container carrier having a top surface which engages the outer flange of the container as the horn engages the covering material.

12. An apparatus for sealing a covering material to an outer flange of a container which includes a first pair of opposite sides and a second pair of opposite sides, the apparatus comprising:
    a first sealing assembly including at least one first horn and first means for applying pressure to the outer flange and to the covering material against the at least one first horn;
    a second sealing assembly including at least one second horn and second means for applying pressure to the outer flange and to the covering material against the at least one second horn, the second sealing assembly being spaced apart from the first sealing assembly;
    means for vibrating the first and second horns at a predetermined frequency to cause friction between the covering material and the outer flange of the container to seal the outer flange of the container to an adjacent portion of the covering material as the outer
    flange and the adjacent portion of the covering material pass between the first and second horns and the first and second pressure applying means, respectively; and
    means for moving the container relative to the first and second sealing assemblies so that the covering material and at least one outer flange adjacent the first pair of opposite sides of the container pass below the at least one first horn so that the covering material and at least one outer flange adjacent the second pair of opposite sides of the container pass below the at least one second horn to form first and second welded seams between the outer flange of the container and the covering material.

13. The apparatus of claim 12, wherein the means for moving the container relative to the first and second sealing assemblies includes a first conveyor for transporting the container in a first direction past the first sealing assembly and a second conveyor for transporting the container in a second direction past the second sealing assembly.

14. The apparatus of claim 12, wherein the first and second pressure applying means each include a wheel assembly having a rotating wheel which engages the outer flange of the container as the first and second horns engage the covering material.

15. The apparatus of claim 14, further comprising a cylinder coupled to each wheel assembly for moving the wheel assemblies toward the first and second horns so that the wheels apply a predetermined amount of pressure to the outer flanges and to the covering material against the first and second horns as the outer flanges of the container and portions of the covering material positioned over the outer flanges pass between the first and second horns and the wheels.

16. The apparatus of claim 14, wherein the each of the wheels includes an edge surface for contacting a bottom surface of the outer flange of the container.

17. The apparatus of claim 16, wherein each of the wheels is formed to include a plurality of notched sections to prevent the edge surface of the wheel from engaging the horn.

18. The apparatus of claim 12, wherein the first and second sealing assemblies each include a guide bar having a ramp surface for forcing the covering material downwardly against the outer flange of the container.

19. The apparatus of claim 18, wherein each guide bar is formed to include an aperture therein to permit the first and second horns to extend through the guide bar and contact the covering material.

20. The apparatus of claim 12, wherein the first and second horns are aligned at first and second predetermined angles relative to the covering material, the first and second predetermined angles being adjustable so that the first and second horns cause friction between the covering material and the outer flange and also propel the covering material in a direction of movement of the container.

21. An apparatus for sealing a covering material to an outer flange of a container including a first pair of opposite sides and a second pair of opposite sides, the apparatus comprising:
a first pair of sealing assemblies for sealing the first pair of opposite sides of the outer flange of the container to adjacent portions of the covering material along a first pair of seam lines;
a first conveyor for transporting the container in a first direction through the first pair of sealing assemblies;
a second pair of sealing assemblies for sealing the second pair of opposite sides of the outer flange of the container to adjacent portions of the covering material along a second pair of seam lines; and
a second conveyor for transporting the container in a second direction through the second pair of sealing assemblies.

22. The apparatus of claim 21, wherein each of the sealing assemblies include a horn, means for applying pressure to the outer flange and to the covering material against the horn, and means for vibrating the horn at a predetermined frequency to cause friction between the outer flange and the covering material to seal the outer flange to adjacent portions of the covering material.

23. The apparatus of claim 22, wherein each pressure applying means includes a wheel assembly having a rotating wheel which engages the outer flange of the container as the horn engages the covering material.

24. The apparatus of claim 23, further comprising a cylinder coupled to each wheel assembly for moving the wheel assemblies toward the horns so that the wheels apply a predetermined amount of pressure to the outer flanges and to the covering material against the horn as the outer flanges of the container and portions of the covering material positioned over the outer flanges pass between the horns and the wheels.

25. The apparatus of claim 22, wherein the pressure applying means includes a container carrier for aligning the covering material relative to the container so that a portion of the covering material is positioned over the outer flange of the container, the container carrier having a top surface which engages the outer flange of the container as the horn engages the covering material.

26. The apparatus of claim 22, each of the horns is aligned at a predetermined angle relative to the covering material, the predetermined angle of each horn being adjustable so that the horns cause friction between the outer flange and the covering material and also help propel the covering material in a direction of movement of the container.

27. The apparatus of claim 21, wherein the first pair of seam lines overlaps the second pair of seam lines at corner portions of the container.

28. The apparatus of claim 21, wherein the first conveyor continuously moves the container along a first predetermined path relative to the first pair of sealing assemblies and the second conveyor continuously moves the container along a second predetermined path relative to the second pair of sealing assemblies.

29. The apparatus of claim 21, wherein the first conveyor is aligned at a predetermined angle relative to the second conveyor, and wherein an end portion of the first conveyor is located adjacent the second conveyor so that containers move off the end portion of the first conveyor and onto the second conveyor.

30. A method for sealing a covering material to an outer flange of a container, the method comprising the steps of:
placing a covering material over the container flange;
providing a sealing assembly including a horn and means for applying pressure to the outer flange and to the covering material against the horn;
moving the container relative to the sealing assembly so that the outer flange of the container and a portion of the covering material positioned over the outer flange passes below the horn;
vibrating the horn at a predetermined frequency to cause friction between the outer flange of the container and the covering material as the outer flange of the container and the portion of the covering material positioned over the outer flange moves between the horn and the pressure applying means to seal the outer flange to the covering material; and
adjusting the angle of the horn relative to the covering material to help propel the covering material in a direction of movement of the container.

31. The method of claim 30, further comprising the steps of:
reorienting the container relative to the sealing assembly, and
moving the reoriented container carrier relative to the sealing assembly so that a second portion of the outer flange of the container and a portion of the covering material positioned over the second portion of the outer flange pass below the horn to seal the second portion of the outer flange to the covering material.

32. The method of claim 30, further comprising the step of controlling the amount of pressure applied by the pressure applying means to the outer flange and to the covering material against the horn.

33. A method for sealing a covering material to an outer flange of a container, the method comprising the steps of:

placing a covering material over the container flange;

providing first and second spaced apart sealing assemblies, each sealing assembly including a horn and means for applying pressure to the outer flange and to the covering material against the horn;

moving the container relative to the sealing assemblies so that outer flanges of the container adjacent a first pair of opposite sides of the container and the covering material pass below the horns of the first and second sealing assemblies;

vibrating the horns of the first and second sealing assemblies at a predetermined frequency to cause friction between the outer flanges of the container and the covering material as the outer flanges of the container and the portions of the covering material positioned over the outer flanges move between the horns and the pressure applying means of the first and second sealing assemblies, respectively, to seal the outer flanges of the container adjacent a first pair of opposite sides of the container to the covering material.

34. The method of claim 33, further comprising the steps of:

providing third and fourth spaced apart sealing assemblies, the third and fourth sealing assemblies each including a horn and means for applying pressure to the outer flange and to the covering material against the horn;

orienting the container relative to the third and fourth sealing assemblies;

moving the oriented container relative to the third and fourth sealing assemblies so that outer flanges of the container adjacent a second pair of opposite sides of the container and the covering material pass below the horns of the third and fourth sealing assemblies, respectively; and vibrating the horns of the third and fourth sealing assemblies at a predetermined frequency to cause friction between the outer flanges of the container and the covering material as the outer flanges of the container and the portions of the covering material positioned over the outer flanges move between the horns and the pressure applying means of the third and fourth sealing assemblies to seal the unsealed portions of the outer flanges of the container adjacent a second pair of opposite sides of the container to the covering material.

35. The method of claim 33, further comprising the step of controlling the amount of pressure applied by the pressure applying means to the outer flange of the container and the covering material against the horns.

36. The method of claim 33, further comprising the step of adjusting the angle of the horns of the first and second sealing assemblies relative to the covering material to help propel the covering material in a direction of movement of the container.

* * * * *